US012711740B2

(12) United States Patent
Behpour et al.

(10) Patent No.: US 12,711,740 B2
(45) Date of Patent: Aug. 18, 2026

(54) SYSTEM AND METHOD FOR OUT-OF-DISTRIBUTION DETECTION OF VISUAL CONTENT USING GENERAL REPRESENTATION AND INFORMATIVE CONTENT

(71) Applicant: Robert Bosch GmbH, Stuttgart (DE)

(72) Inventors: Sima Behpour, Sunnyvale, CA (US); Thang Doan, San Francisco, CA (US); Xin Li, Sunnyvale, CA (US); Wenbin He, Santa Clara, CA (US); Liang Gou, San Jose, CA (US); Liu Ren, Saratoga, CA (US)

(73) Assignee: Robert Bosch GmbH, Stuttgart (DE)

( * ) Notice: Subject to any disclaimer, the term of this patent is extended or adjusted under 35 U.S.C. 154(b) by 229 days.

(21) Appl. No.: 18/768,585

(22) Filed: Jul. 10, 2024

(65) Prior Publication Data

US 2026/0017922 A1 Jan. 15, 2026

(51) Int. Cl.
*G06V 10/00* (2022.01)
*G06T 9/00* (2006.01)
(Continued)

(52) U.S. Cl.
CPC .............. *G06V 10/764* (2022.01); *G06T 9/00* (2013.01); *G06V 10/44* (2022.01); *G06V 10/761* (2022.01)

(58) Field of Classification Search
None
See application file for complete search history.

(56) References Cited

U.S. PATENT DOCUMENTS

2024/0161369 A1* 5/2024 Li ........................... G06T 11/60
2024/0282131 A1* 8/2024 Ren .................... G06V 10/7753
(Continued)

FOREIGN PATENT DOCUMENTS

CN 120375115 A 7/2025

OTHER PUBLICATIONS

Yifei Ming, et al., "Delving into Out-of-Distribution Detection with Vision-Language Representations", 36th Conference on Neural Information Processing Systems, (NeurIPS 2022), arXiv:2211.13445v1, 22 pages.
(Continued)

*Primary Examiner* — Joseph R Haley
(74) *Attorney, Agent, or Firm* — Brooks Kushman, P.C.

(57) ABSTRACT

A method includes encoding a set of hierarchical text prompts to define a set of text embeddings, where the set of hierarchical text prompt defines a primary informative prompt and a secondary informative prompt associated with the primary informative prompt. The method further includes encoding an input image to define a plurality of feature representations, changing a value of one or more identified feature representations among the plurality of feature representations to mask the one or more identified feature representation and define a general feature representation of the input image based on a class-specific threshold indicative of boundary between a class-specific feature and a general feature. The method further includes classifying the input image based on an out-of-distribution (OOD) score determined using a similarity analysis of the general feature representation and the set of text embeddings.

20 Claims, 3 Drawing Sheets

(51) Int. Cl.

| | |
|---|---|
| ***G06V 10/44*** | (2022.01) |
| ***G06V 10/74*** | (2022.01) |
| ***G06V 10/764*** | (2022.01) |

(56) References Cited

U.S. PATENT DOCUMENTS

2025/0191337 A1* 6/2025 Willmott .............. G06V 10/761
2025/0378367 A1* 12/2025 Cetoli .................... G06N 20/00

OTHER PUBLICATIONS

Hualiang Wang, et al., "CLIPN for Zero-Shot OOD Detection: Teaching CLIP to Say No", In Proceedings of the IEEE/CVF International Conference on Computer Vision, 2023, arXiv:2308. 12213v2, 11 pages.
Zihao Wei et al: "Efficient Vision-Language Pre-training by Cluster Masking", arxiv.org, Cornell University Library, 201 Olin Library Cornell University Ithaca, NY 14853, May 14, 2024, XP091756988.
Felix Michels et al: "Contrastive Language-Image Pretrained (CLIP) Models are Powerful Out-of-Distribution Detectors", arxiv.org, Cornell University Library, 201 Olin Library Cornell University Ithaca, NY 14853, Mar. 10, 2023, XP091458545.
Yuxiao Lee et al: "Reframing the Relationship in Out-of-Distribution Detection", arxiv.org, Cornell University Library, 201 Olin Library Cornell University Ithaca, NY 14853, May 27, 2024, XP091768847.

* cited by examiner

SYSTEM AND METHOD FOR OUT-OF-DISTRIBUTION DETECTION OF VISUAL CONTENT USING GENERAL REPRESENTATION AND INFORMATIVE CONTENT

TECHNICAL FIELD

Aspects of the present disclosure are generally directed to systems and methods for detecting out of distribution input data indicative of visual content.

BACKGROUND

Out-of-Distribution (OOD) detection involves identifying data that significantly differs from what a model has seen during training. OOD detection may recognize anomalies or new, unseen patterns when the model encounters data outside its training set.

OOD detection can hold significant importance in real-world machine learning applications, where the emergence of unfamiliar classes can require specialized attention. Some OOD detection methods predominantly rely on single-modal learning approaches that depend only on visual data for OOD detection, which may be limiting when OOD inputs can visually resemble in-distribution (ID) data but exhibit semantic distinctions from known ID classes. For example, in image classification, labels are often encoded as one-hot vectors that overlook semantic information embedded in textual descriptions. Traditional single-modality methods can rely on robust feature and specific distance metrics to discern OOD data from ID data.

SUMMARY

In one form, the present disclosure is directed to a method that includes encoding a set of hierarchical text prompts to define a set of text embeddings, where the set of hierarchical text prompt defines a primary informative prompt and a secondary informative prompt associated with the primary informative prompt. The method further includes encoding an input image to define a plurality of feature representations, changing a value of one or more identified feature representations among the plurality of feature representations to mask the one or more identified feature representation and define a general feature representation of the input image based on a class-specific threshold indicative of boundary between a class-specific feature and a general feature, and classifying the input image based on an out-of-distribution (OOD) score determined using a similarity analysis of the general feature representation and the set of text embeddings.

In one form, the present disclosure is directed to a system that includes one or more hardware computing devices configured to define a set of text embeddings from a set of hierarchical text prompts using a text encoder, where the set of hierarchical text prompts define a primary informative prompt and a secondary informative prompt associated with the primary informative prompt. The one or more hardware computing devices are also configured to define a plurality of feature representations of an input image using an image encoder, change a value of one or more identified feature representations among the plurality of feature representations to mask the one or more identified feature representation and define a general feature representation of the input image based on a class-specific threshold indicative of boundary between a class-specific feature and a general feature. The one or more hardware computing devices are also configured classify the input image based on an out-of-distribution (OOD) score determined using a similarity analysis of the general feature representation and the set of text embeddings.

In one form, the present disclosure is directed to a non-transitory computer-readable medium comprising instructions for a multi-modal out-of-distribution detection system that, when executed by one or more hardware computing devices cause the one or more hardware computing devices to perform operations including to: define a feature representation matrix of a set of in-distribution (ID) images using a first image encoder; define a set of mean variances for the feature representation matrix using principal component analysis of the feature representation matrix; select a class-specific threshold based on a mean variance diminishing gradient point at which a rate of change of the mean variance is zero; define a set of text embeddings from a set of hierarchical text prompts using a text encoder, the set of hierarchical text prompt define a primary informative prompt and a secondary informative prompt associated with the primary informative prompt; define a plurality of feature representations of an input image using a second image encoder; change a value of one or more identified feature representations among the plurality of feature representations to mask the one or more identified feature representation and define a general feature representation of the input image based on a class-specific threshold indicative of boundary between a class-specific feature and a general feature; calculate an out-of-distribution (OOD) score using softmax analysis of the general feature representation and the set of text embeddings; and classify the input image at ID or OOD based on the OOD.

DETAILED DESCRIPTION

Figure 1:
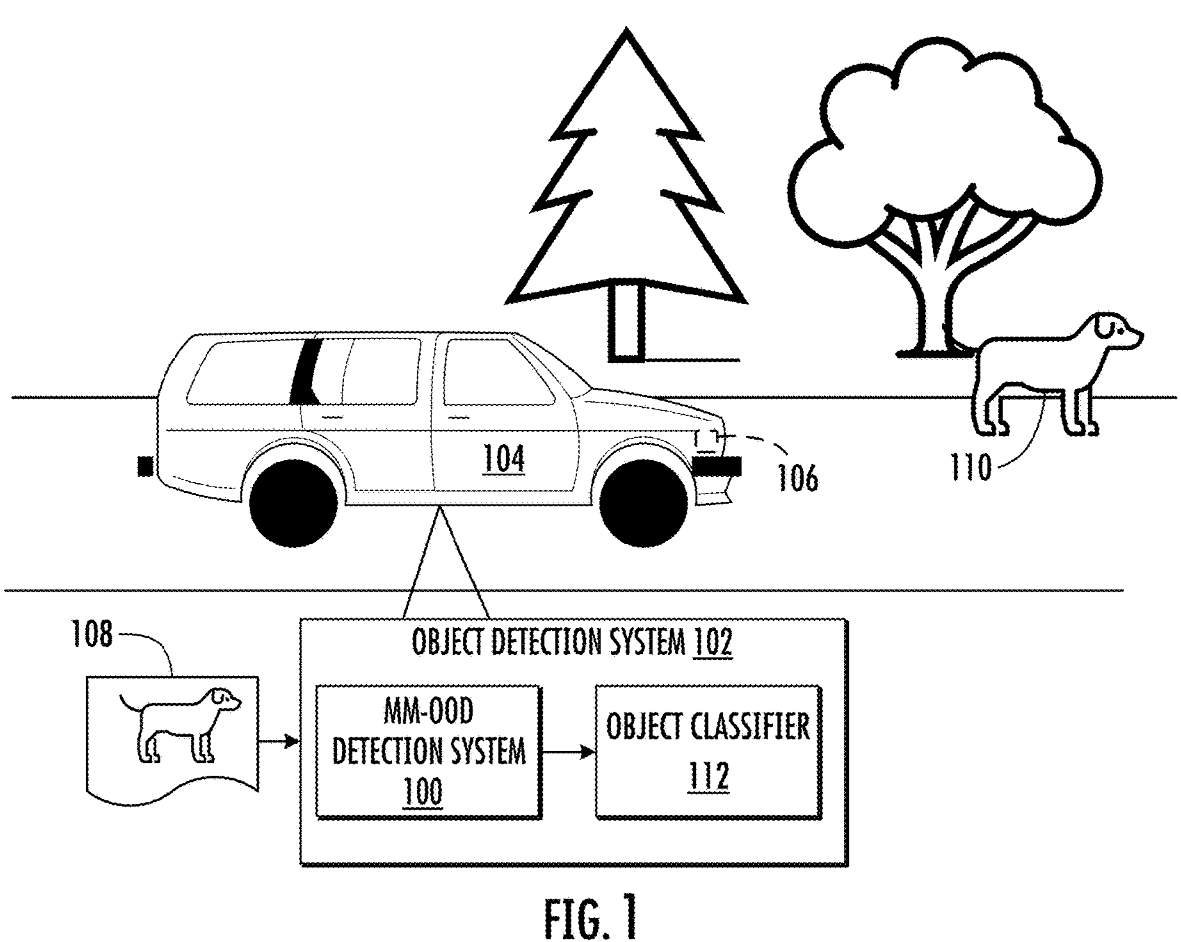
FIG. 1 is an example application of a general representation and informative content (GRIC) out-of-distribution (OOD) detector.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Recent advancements in multi-modal pre-training techniques, such as contrastive language-image pre-training (CLIP), correlate images with textual description. CLIP may employ a self-supervised contrastive objective, align images with respective textual descriptions, and utilize a dual-stream model with a prompt text encoder and an image encoder. However, models like CLIP typically operate in a "closed-world" setting, conducting zero-shot classification within a predetermined set of classes, even if the input is irrelevant.

In lieu of using single-modal OOD detection techniques, a multi-modal approach may be employed, but may include some drawbacks. For example, defining OOD in a multi-modal approach leveraging vision-language frames (e.g., CLIP) where the training dataset is not disclosed, can be an issue.

Another potential drawback in constructing a multi-modal OOD detection technique includes identifying specific segments within vision features that integrates with text features. Methods such as integrating OOD labels into the multi-modal approach, such as CLIP, or generating labels with a visual encoder provided with CLIP focus on pre-defined labels for ID dataset. In contrast, maximum concept matching (MCM) operates without prior OOD information, covering a wide range of real-world datasets. However, these methods rely solely on entire visual feature representations, and do not incorporate textual representations.

In one form, the present disclosure is directed to systems and/or methods for detecting OOD dataset indicative of visual content using a general feature representation of the visual content and informative textual content having a multi-level hierarchical structure. In a non-limiting example, a multi-modal OOD (MM-OOD) detection system of the present disclosure is configured to define a general feature representation vector for an image by masking one or more identified feature representations among a plurality of feature representations based on a general feature index that represents a quantity boundary between a class specific feature and a general feature. In one form, the MM-OOD detection system may further encode a hierarchical text prompt assigned to the input image to obtain text embeddings. The hierarchical text prompt defines a primary informative prompt and a secondary informative prompt associated with the primary information prompt. Using at least one of the general feature representations or the text embedding, the MM-OOD detection system may calculate an OOD score for the visual content of the image, where the OOD score is used to classify the visual content.

Image feature representation may include two distinct types of features: class-specific feature representation and general feature representation. Class-specific feature representation delineates boundaries between different classes that may be used for tasks like image classification. General feature representation captures patterns that are pervasive across all classes, known for their generalizability and robustness. In the context of OOD detection, the objective is to identify samples that differ from all ID classes. The MM-OOD detection system utilizes the general feature representation of ID data to encapsulate patterns prevalent across all classes and compute the OOD score.

With the use of general representation and informative content (GRIC), the MM-OOD detection system of the present disclosure may be described as employing a GRIC approach or GRIC technique.

Unlike prior techniques focusing only on vision features, the MM-OOD detection system of the present disclosure uses general or common features in capturing a comprehensive dataset representation, which assist in distinguishing between ID and OOD data. The GRIC approach of the present disclosure distinguishes OOD data by using the general or common feature representation of ID data, which masks ID class-specific features. In addition, the GRIC approach employs text prompts that are enhanced with additional informative data such as the primary informative prompt (e.g., a super-class prompt) that broadly captures or classifies the secondary informative prompt.

Referring to FIG. 1, in an example implementation, a MM-OOD detection system 100 of the present disclosure is provided as part of an object detection system 102 of a vehicle 104. In a non-limiting example, the vehicle 104 includes one or more cameras 106 arranged about the vehicle 104 to capture one or more images 108 of a surrounding area of the vehicle 104. The images 108 are processed by the object detection system 102 to detect and identify objects in the image 108. In a non-limiting example, the MM-OOD detection system 100 is configured to provide an OOD score for the image 108 capturing the object, such as a dog 110. Using the OOD score, an object classifier 112 may identify or classify the object in the image 108. In one form, if the OOD score indicates in-distribution (ID) data, the object classifier 112 processes the image to identify the object. On the other hand, if the OOD score indicates that the image is OOD, the image may be marked as unknown.

In one form, by detecting and identifying the object, the vehicle 104 may perform certain operations to monitor position of the object relative to the vehicle 104 and/or take certain actions such as stopping the vehicle 104 or warning a passenger of the object using one or more human machine interfaces in the vehicle 104. For example, if the object classifier identifies the dog 110 in the image 108, the vehicle 104 may monitor the position of the dog relative to the vehicle 104 recognizing the dog 110 may move toward the vehicle 104. Alternatively, if the OOD score indicates the image 108 is OOD and thus, the object classifier 112 is unable to identify the object, the vehicle 104 may treat the object as an unknown object that may still be monitored for it may be unclear if the object is fixed or moveable.

While a specific implementation is provided, the MM-OOD detection system 100 may be employed in other systems and should not be limited to the example provided herein. In a non-limiting example, the MM-OOD detection system 100 may be used in a vision system for monitoring autonomous vehicles and/or in a security system as part of a biometric detection employed to identify an individual. Another specific implementation includes using the OOD detection system 100 as a control system to determine or ascertain an actuation signal from the OOD score and/or the object classifier 112. The actuation signal may be used to control a vision system, an autonomous vehicle, and/or a security system. The actuation signal may be supplied or transmitted to the controlled system. The controlled system may be activated and/or controlled using the actuation signal.

Figure 2:
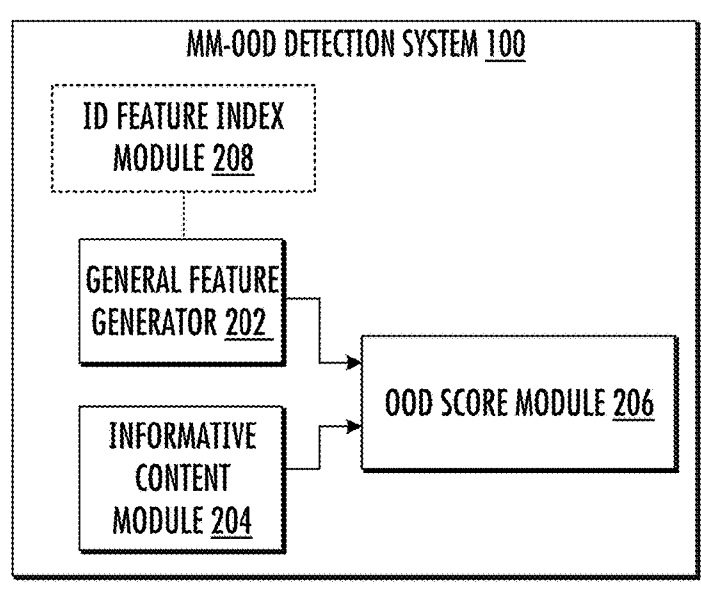
FIG. 2 is a block diagram of the GRIC OOD detector of FIG. 1.
Figure 3:
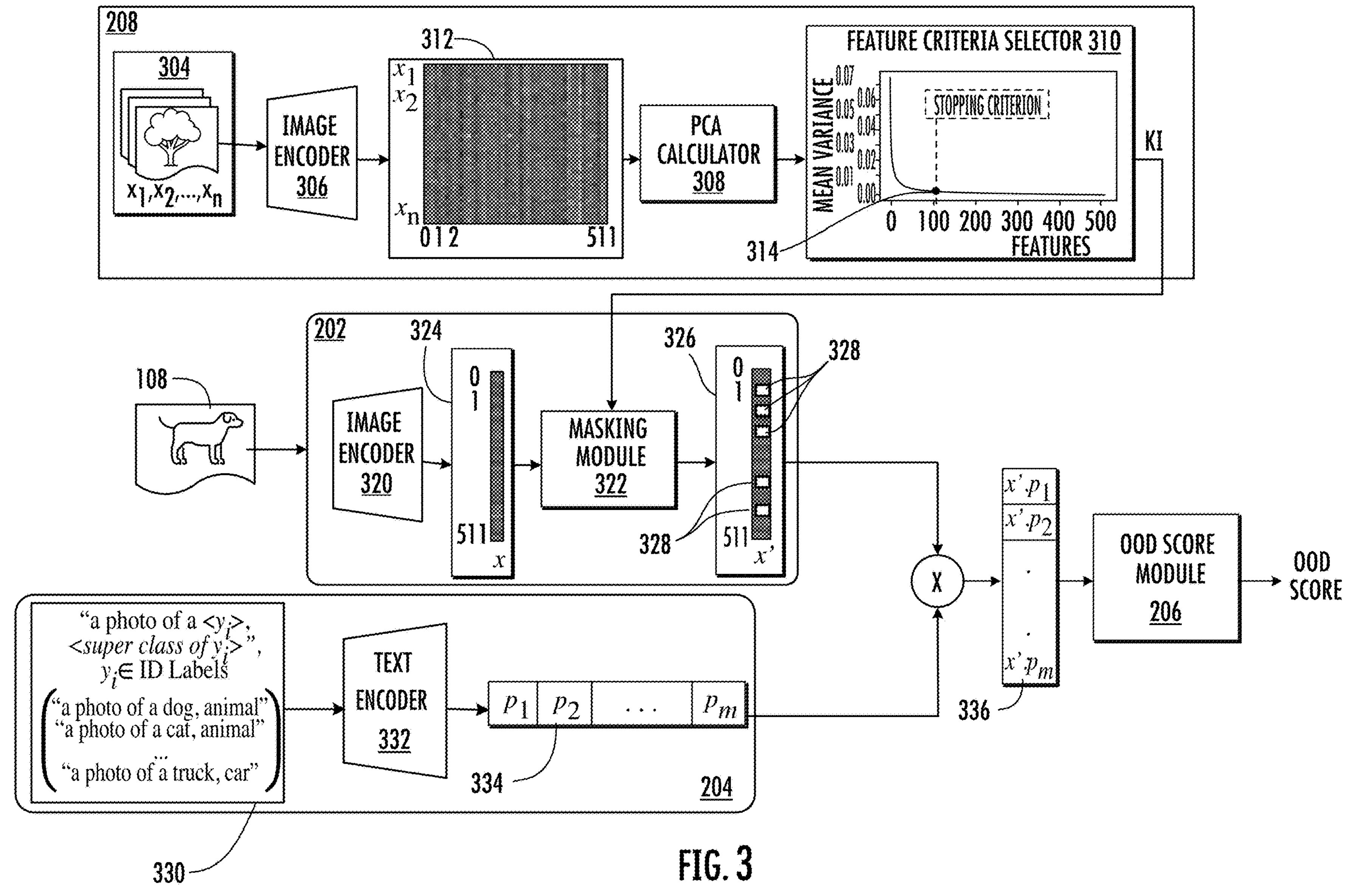
FIG. 3 is a block diagram of the GRIC OOD detector of FIG. 2.

Referring to FIGS. 2 and 3, the MM-OOD detection system 100 is configured to incorporate a general feature representation of ID data and/or informative prompts. The accuracy of OOD detection is notably enhanced by both vision and text feature representations. In one form, the MM-OOD detection system 100 includes a general feature module 202, an informative content module 204, an OOD score module 206, and an ID feature index module 208.

The general feature module 202 is configured to process the image 108 to generate a general representation of ID data by masking class-specific features. Class-specific features reside on boundaries between different classes, and are employed for tasks like image classification. General features capture patterns common across all ID classes, and are employed for generalizability and robustness.

By identifying the general feature representation, the MM-OOD detection system 100 may improve response to input data variation that it has not explicitly encountered during training. In addition, feature masking may serve as a form of regularization to inhibit relying excessively on class-specific features.

In a non-limiting example scenario, an object detection system for an autonomous vehicle (AV) may be trained to discern various vehicle classes like trucks, cars, and bicycles. Throughout training, the object detection system grasps distinctive features associated with each class by noting attributes like wheels and back-side shape. Once in the real world, the AV encounters other types of vehicles out-of-bound of the original trained data, such as, but not limited to, a carriage. Due to appearance of the carriage having specific features like wheels and structure, the object detection system may misclassify the carriage as a truck. By classifying the carriage as a truck, the AV may make misplaced assumptions about the operation of the carriage.

To mitigate misclassification and reduce other types of errors, the general feature module 202 removes or masks the class-specific features to have a visual content of the image categorized under a broader category (e.g., the carriage, as the visual content, may be categorized broadly as a vehicle, encompassing overall size/shape and the presence of a human).

To identify class-specific features, the general feature module 202 employes a general feature index or threshold that represents a quantity boundary between a class-specific feature and a general feature. In a non-limiting example, the general feature index is defined by the ID feature index module 208 that processes a set of predefined ID images 304 having n-number of images (e.g., $x_1, x_2, \ldots, x_n$) (FIG. 3). In one form, the ID feature index module 208 includes an image encoder 306, a principal component analysis (PCA) calculator 308, and a feature criteria selector 310.

The image encoder 306 is configured to process the set of predefined ID images 304 to generate a representation matrix 312

$$\text{(e.g., } R_{ID}^{nxr}\text{)}$$

having "n" representations each of length r (e.g., 512). In a non-limiting example, the image encoder 306 is a CLIP image encoder.

The PCA calculator 308 is configured to calculate principal components along with their associated variances. For instance, PCA may discern a low-rank subspace within the data. In one form, the PCA calculator 308 provides principal component for each image as a matrix with dimensions of n-components×n-features, where n-components represents the number of principal components, and n-features denotes the total number of features (r).

Operating as a feature extraction method, PCA transforms original features into linearly uncorrelated variables, known as principal components. The principal components are chosen to maximize variance in the dataset, capturing the most informative and discriminative features. In the realm of class-specific classification tasks, PCA identifies principal components contributing significantly to the variance within each class. This focused representation enhances the efficiency of class-specific models, enabling a more streamlined exploration of the intrinsic structure of the data. For OOD detection, the MM-OOD detection system 100 employs the PCA to neutralize features associated with specific classes to obtain the general feature representation.

The feature criteria selector 310 is configured to calculate indices of most important image features for ID images 304. In one form, the feature criteria selector 310 is configured to calculate the mean variance of features across the principal components to yield vectors known as the mean-variance vectors. In a non-limiting example, the feature criteria selector 310 utilizes a mapping function to project the PCA components and their variances back to the original feature space (e.g., matrix 312), including their mean variance. The mean variances are arranged in descending order, and the feature criteria selector 310 identifies a class-specific (CS) threshold, denoted as K, based on a point where the rate of mean variance change becomes gradual and approaches zero (e.g., point 314), which is called mean variance diminishing gradient point. That is, $|\Delta(v)_k| \leq \epsilon_{th}$, the difference in mean variance between k and k+1 features is less than a threshold $\epsilon_{th}$. This convergence criterion recognizes that each additional feature has less variance than the preceding one, emphasizing the significance of the initial ones.

Following the determination of the CS threshold, the feature criteria selector 310 identifies indices corresponding to the K most important features and stores them in a vector named K-I. The act of masking the most significant feature representations of ID data with this vector results in the derivation of the general ID feature representation. The determined value of K and associated principal components pinpoint the indices of class-specific features in the ID representation matrix 312. The K-I vector is employed as a general feature index by the general feature module 202.

In one form, with the general feature index, the general feature module 202, the informative content module 204, and the OOD score module 206 may be employed in various types of systems for providing the OOD score. That is, the ID feature index module 208 may be separate from the other modules 202, 204, and 206. In another variation, the ID feature index module 208 may be included as part of the MM-GOD detection system 100 provided at a system employing OOD scoring.

Using the general feature index, the general feature module 202 is configured to mask the corresponding features of images 108 to have the remaining indices represent general features across all ID data. In one form, the general feature module 202 is configured to include an image encoder 320 and a masking module 322.

The general feature module 202 is configured to pass the image 108 through the image encoder 320 to obtain a feature representation 324 of the image 108. In one form, the image encoder 320 is a CLIP image encoder.

The masking module 322 is configured to mask feature representations based on the general feature index (e.g., based on the identified indices in K-I). In a non-limiting example, to mask a feature, the masking module 322 is configured to detect a feature that satisfies the general feature index (e.g., value of a feature x is greater than or equal to value of K-I). The value of the detected feature, which is indicative of a class-specific feature, is set to zero, resulting in a general feature representation 326 in which masked features are represented by boxes 328.

The general feature module 202 retains the general features while discarding the most if not all class-specific features. That is, the act of masking the most significant feature representations of ID data with this vector results in the derivation of the general ID representation. In essence, this procedure involves neutralizing features that are highly specific to ID data, allowing for the retention of only those features that contribute to the general representation of ID data.

The general feature module 202 removes class-specific features by assigning them a value of zero. This assists in mitigating the influence class-specific feature may have in OOD score computation. While the general feature module 202 assigns a value of zero, the features may be masked with other values, however, other values may be carefully selected as alternative non-zero values may intricately interact with network weights, potentially leading to varied outcomes, either positive or negative.

The informative content module 204 is configured to integrate hierarchical information, such as superclass names (e.g., a primary informative prompt), into OOD detection. In one form, the informative content module 204 employs a set of predefined hierarchical ID text prompts 332 having a hierarchical structure, where a set of ID labels are integrated with a superclass name (e.g., a primary text prompt). In a non-limiting example, if the ID label focuses on dog images with an original text prompt of "image of a dog," the term "animal" is added as the superclass name to define a hierarchical text prompt of "an image of a dog, animal." For instance, "animal" is provided as a primary informative prompt and "dog" is a secondary informative prompt that is associated with the primary information prompt.

In one form, the informative content module 204 includes a text encoder 332, such as, but not limited to a CLIP text encoder. The text encoder 332 processes the set of hierarchical ID text prompts 330 to generate a set of text feature vectors 334 (T ($p_i$), where $p_i$ corresponds to the text prompt "a photo of a ⟨$y_i$⟩"). The set of text feature vectors 334 are represented as embeddings derived from respective text prompts. In a non-limiting example, if the prompt is "an image of a dog, animal," "$y_i$" is "dog, animal," where "dog" is a class or secondary informative prompt, and "animal" is a superclass or primary informative prompt that encompasses the secondary informative prompt. By having the hierarchical text prompts, the text encoder 332 may capture nuanced semantics and contextual information of the prompt.

The hierarchical structure enriches understanding of ID labels and patterns to facilitate improved generalization capabilities and recognition of novel instances. For example, relying solely on a single ID label for OOD classifications can restrict the understanding of potential labels and can hinder the ability of an OOD detector to encompass diverse data points due to the inherent constraint of a limited set of ID labels. Secondly, insufficient exposure to ID general patterns can diminish the capacity of an encoder to provide comprehensive generalization, making it challenging to recognize and classify novel instances accurately.

The incorporation of hierarchical information by the informative content module 204 widens the contextual understanding of the text encoder 332 improving effective differentiation between ID and OOD instances. This broader context fosters a stronger association between textual prompts and visual content, enhancing the interpretative abilities of the informative content module 204. Leveraging hierarchical information in OOD detection enhances knowledge of ID labels and general patterns, to improve generalization, widen the context for classification, and enrich the semantic understanding of input data.

The set of text feature vectors 334 and the general feature representation 326 are introduced together as a vector matrix 336 provided to the OOD score module 206 for calculating an OOD score for the visual content of the image 108. In a non-limiting example, the OOD score module 206 utilizes a similarity analysis, such as maximum concept matching (MCM) scoring, to obtain the OOD score. In using MCM scoring, the OOD score module 206 determines a softmax over the cosine similarity score between general image features and text features (e.g., informative content (IC)). For example, for any image (e.g., the image 108), a label-wise matching score ($s_i$(x)) is obtained using equation 1 below in which "I(x)" is the general ID representation of an image x and "T($p_i$)" is the text features of informative content:

$$s_i(x) = \frac{I(x) \cdot T(p_i)}{\|I(x)\| \cdot \|T(p_i)\|} \quad \text{Equation 1}$$

The formal definition of the matching score S(x; $y_{in}$, T, I) is given by equation 2 below. The score (S(x)) provides the match between the input image and the text feature vectors. For ID data, the image is matched to one of the text feature vectors with a high score.

$$S(x) = \max_i \frac{e^{s_i(x)}}{\sum_{j=1}^{N} e^{s_j(x)}} \quad \text{Equation 2}$$

In one form, the OOD detection function is formally expressed in equation 3 below where, "1" represents a positive class or ID, and "0" indicates OOD. A threshold λ is selected to have a high fraction of ID data above the threshold (e.g., 95%). For samples classified as ID, the class prediction can be obtained based on the closest concept: $\hat{y}=\text{argmax}_{i\in[m]} s_i$. For brevity, "S(x)" is used to refer to S(x; Yin, T, I).

$$G(x; y_{in}) = \begin{cases} 1 & S(x) \geq \lambda \\ 0 & S(x) < \lambda \end{cases} \quad \text{Equation 3}$$

The computation of both the similarity score and the OOD score function may employ: the representation of image features and/or representation of text prompt features. The MM-OOD detection system 100 prioritizes these components to enhance the efficacy of the OOD scoring function by using general feature representation of the image 108, and integrating informative prompts (e.g., multiclass or hierarchical prompt structure) as part of the text features.

While the MM-OOD detection system 100 employs a CLIP encoder, other suitable contrastive vision-language pre-training models emphasizing multi-modal feature alignment may be employed.

Figure 4:
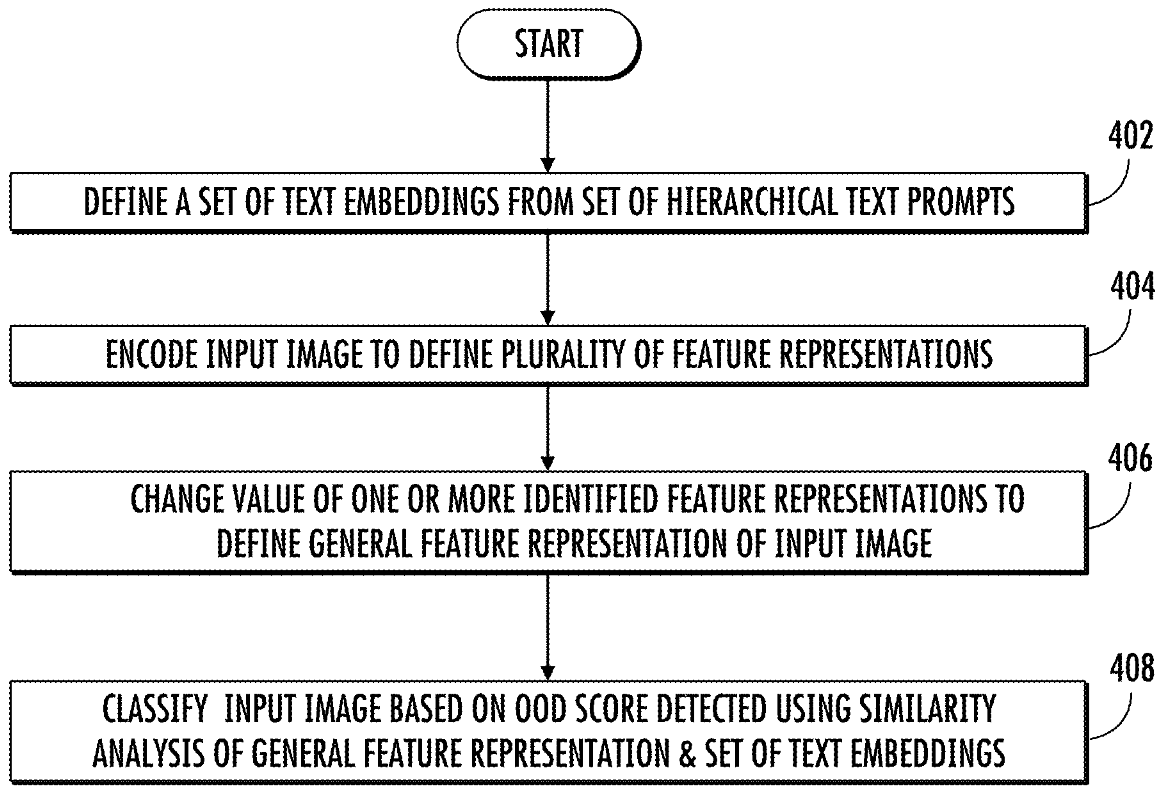
FIG. 4 is a flowchart of an example GRIC OOD detection routine.

Referring to FIG. 4, an example MM-OOD detection routine 400 performed by the MM-OOD system 100 is provided.

At operation 402, a set of text embeddings is defined from a set of hierarchical text prompts using a text encoder. In a non-limiting example, the set of hierarchical text prompts is encoded using a CLIP text encoder to define the set of text embeddings. The set of hierarchical text prompt define a primary informative prompt and a secondary informative prompt associated with the primary informative prompt.

At operation 404, the system 100 encodes the input image 108 to be evaluated to define a plurality of feature representations. In a non-limiting example, the system 100 employs a CLIP image encoder.

At operation 406, the system 100, the system 100 changes a value of one or more identified feature representations to mask the identified feature representation and define a general feature representation of the input image. The feature representations are identified based on a class-specific threshold indicative of boundary between a class-specific feature and a general feature. In a non-limiting example, the value of the identified feature representations is changed to zero.

At operation 408, the system 100 classifies the input image 108 based on an OOD score that is determined based on a similarity analysis of the general feature representation and the set of text embeddings. In a non-limiting example, the OOD score is calculated using softmax analysis.

In one form, the GRIC approach is employed with a zero-shot vision-language OOD detection to illustrate the effectiveness of ID data general representation and informative prompts in detecting OOD instances. The GRIC approach may operate in a training-free manner without necessitating downstream fine-tuning, boasts broad generalizability (a single model supports diverse tasks), exhibits scalability for handling large real-world tasks, and is OOD-agnostic, requiring no specific information regarding OOD data.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

In a non-limiting example, the MM-OOD detection 100 may include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The term memory or memory circuit may be a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are non-volatile memory circuits (such as a flash memory circuit, an erasable programmable read-only memory circuit, or a mask read only circuit), volatile memory circuits (such as a static random access memory circuit or a dynamic random access memory circuit), magnetic storage media (e.g., an analog or digital magnetic tape or a hard disk drive), and optical storage media (e.g., a USB, CD, a DVD, or a Blu-ray Disc).

The MM-OOD detection system 100 described in this application may be partially or fully implemented by a special purpose computer created by configuring a general-purpose computer to execute one or more particular functions embodied in computer programs. Components employed for the MM-OOD detection system 100 may be provided in a single device or may be distributed among multiple devices that are in communication using wireless communication (e.g., cellular network, WiFi network, BLUETOOTH, among others) and/or wired communication.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A method comprising:

encoding a set of hierarchical text prompts to define a set of text embeddings, the set of hierarchical text prompts defining a primary informative prompt and a secondary informative prompt associated with the primary informative prompt;

encoding an input image to define a plurality of feature representations;

changing a value of one or more identified feature representations among the plurality of feature representations to mask the one or more identified feature representation and define a general feature representation of the input image based on a class-specific threshold indicative of boundary between a class-specific feature and a general feature; and classifying the input image based on an out-of-distribution (OOD) score determined using a similarity analysis of the general feature representation and the set of text embeddings.

2. The method of claim 1, wherein the set of hierarchical text prompts is derived from a set of predefined in-distribution labels.

3. The method of claim 1, wherein the class-specific threshold is defined based on a set of known in-distribution images.

4. The method of claim 1, further comprising:

encoding a set of in-distribution (ID) images to define a feature representation matrix of the set of ID images;

defining a set of mean variances for the feature representation matrix using principal component analysis of the feature representation matrix; and selecting the class-specific threshold based on a mean variance diminishing gradient point at which a rate of change of the mean variance is zero.

5. The method of claim 1, wherein the value of the one or more identified feature representations is set to zero to mask the identified feature representation.

6. The method of claim 1, wherein the encoding of the input image includes using a contrastive language image pre-training image encoder.

7. The method of claim 1, the encoding of the set of hierarchical text prompt includes using a contrastive language image pretraining text encoder.

8. The method of claim 1, further comprising identifying a visual content of the input image in response to the input image being ID as provided by the OOD score.

9. The method of claim 1, further comprising calculating the OOD score using softmax analysis, as the similarity analysis, of the general feature representation and the set of text embeddings.

10. A system comprising:

one or more hardware computing devices configured to:

define a set of text embeddings from a set of hierarchical text prompts using a text encoder, the set of hierarchical text prompts define a primary informative prompt and a secondary informative prompt associated with the primary informative prompt, define a plurality of feature representations of an input image using an image encoder;

change a value of one or more identified feature representations among the plurality of feature representations to mask the one or more identified feature representation and define a general feature representation of the input image based on a class-specific threshold indicative of boundary between a class-specific feature and a general feature; and classify the input image based on an out-of-distribution (OOD) score determined using a similarity analysis of the general feature representation and the set of text embeddings.

11. The system of claim 10, wherein the set of hierarchical text prompts is derived from a set of predefined in-distribution labels.

12. The system of claim 10, wherein the class-specific threshold is defined based on a set of known in-distribution images.

13. The system of claim 10, wherein the one or more hardware computing devices are further configured to:

define a feature representation matrix of a set of in-distribution (ID) images using a second image encoder, define a set of mean variances for the feature representation matrix using principal component analysis of the feature representation matrix, and select the class-specific threshold based on a mean variance diminishing gradient point at which a rate of change of the mean variance is zero.

14. The system of claim 10, wherein the value of the one or more identified feature representations is set to zero to mask the identified feature representation.

15. The system of claim 10, wherein the image encoder is a contrastive language image pre-trained image encoder.

16. The system of claim 10, the text encoder is a contrastive language image pretrained text encoder.

17. The system of claim 10, wherein the one or more hardware computing devices are further configured to identify a visual content of the input image in response to the input image being ID as provided by the OOD score.

18. The system of claim 10, wherein the one or more hardware computing devices are further configured to calculate the OOD score using softmax analysis, as the similarity analysis, of the general feature representation and the set of text embeddings.

19. A non-transitory computer-readable medium comprising instructions for a multi-modal out-of-distribution detection system that, when executed by one or more hardware computing devices cause the one or more hardware computing devices to perform operations including to:

define a feature representation matrix of a set of in-distribution (ID) images using a first image encoder;

define a set of mean variances for the feature representation matrix using principal component analysis of the feature representation matrix;

select a class-specific threshold based on a mean variance diminishing gradient point at which a rate of change of the mean variance is zero;

define a set of text embeddings from a set of hierarchical text prompts using a text encoder, the set of hierarchical text prompt define a primary informative prompt and a secondary informative prompt associated with the primary informative prompt;

define a plurality of feature representations of an input image using a second image encoder;

change a value of one or more identified feature representations among the plurality of feature representations to mask the one or more identified feature representation and define a general feature representation of the input image based on a class-specific threshold indicative of boundary between a class-specific feature and a general feature;

calculate an out-of-distribution (OOD) score using softmax analysis of the general feature representation and the set of text embeddings; and classify the input image at ID or OOD based on the OOD.

20. The non-transitory computer-readable medium of claim 19, wherein the value of the one or more identified feature representations is set to zero to mask the identified feature representation.

* * * * *